US011271648B2

(12) United States Patent
Ben-Yehuda et al.

(10) Patent No.: US 11,271,648 B2
(45) Date of Patent: Mar. 8, 2022

(54) SPATIAL OPTICAL WIRELESS COMMUNICATION SYSTEM

(71) Applicant: Supreme Architecture Ltd., Tel-Aviv (IL)

(72) Inventors: Ido Ben-Yehuda, Emek Hefer (IL); Yariv Ben-Yehuda, Caesarea (IL)

(73) Assignee: Supreme Architecture Ltd., Tel-Aviv (IL)

(*) Notice: Subject to any disclaimer, the term of this patent is extended or adjusted under 35 U.S.C. 154(b) by 0 days.

(21) Appl. No.: 16/629,566

(22) PCT Filed: Jul. 10, 2018

(86) PCT No.: PCT/IL2018/050754
§ 371 (c)(1),
(2) Date: Jan. 9, 2020

(87) PCT Pub. No.: WO2019/012532
PCT Pub. Date: Jan. 17, 2019

(65) Prior Publication Data
US 2021/0159980 A1    May 27, 2021

Related U.S. Application Data

(60) Provisional application No. 62/530,930, filed on Jul. 11, 2017.

(51) Int. Cl.
*H04B 10/00*    (2013.01)
*H04B 10/114*    (2013.01)
(Continued)

(52) U.S. Cl.
CPC ..... *H04B 10/1149* (2013.01); *H04B 10/1129* (2013.01); *H04N 7/22* (2013.01)

(58) Field of Classification Search
CPC ... H04B 10/1149; H04B 10/1129; H04N 7/22
(Continued)

(56) References Cited

U.S. PATENT DOCUMENTS

| 10,034,209 B1* | 7/2018 | Nandan | H04B 7/18504 |
| 2011/0069962 A1* | 3/2011 | Castor | H05B 47/195 |
| | | | 398/115 |

(Continued)

FOREIGN PATENT DOCUMENTS

| EP | 2498210 | 9/2012 |
| GB | 2505978 | 3/2014 |

(Continued)

OTHER PUBLICATIONS

International Preliminary Report on Patentability dated Jan. 23, 2020 From the International Bureau of WIPO Re. Application No. PCT/IL2018/050754. (7 Pages).

(Continued)

*Primary Examiner* — Mohammad R Sedighian

(57) ABSTRACT

A system comprising a plurality of points of access deployed in venue having a crowd area located next to an event happening area, each one of the plurality of points of access comprising an optical transmitter adapted to broadcast an encoded media stream in light emissions, a plurality of portable optical receiver units, each having: a connector adapted to be electrically connected to one of a plurality of client devices, an optical receiver adapted to capture the light emissions, and a controller adapted to convert the light emissions into a digital stream forwarded via the connector to a respective client device of the plurality of client devices to allow a presentation of the digital stream on a display of the respective client device by an application executed on the respective client device.

16 Claims, 11 Drawing Sheets

(51) Int. Cl.
*H04B 10/112* (2013.01)
*H04N 7/22* (2006.01)
(58) Field of Classification Search
USPC .......................................... 398/140
See application file for complete search history.

(56) References Cited

U.S. PATENT DOCUMENTS

| | | |
|---|---|---|
| 2013/0315604 A1 | 11/2013 | LoPresti et al. |
| 2015/0002731 A1* | 1/2015 | Raskar ............... H04N 5/35545 348/362 |
| 2015/0093107 A1* | 4/2015 | Jovicic ................ H04B 10/116 398/25 |
| 2016/0344477 A1* | 11/2016 | Pederson ........... H04B 10/1149 |
| 2017/0346559 A1 | 11/2017 | Eroglu et al. |

FOREIGN PATENT DOCUMENTS

| | | |
|---|---|---|
| WO | WO 2019/012532 | 1/2019 |
| WO | WO 2019/012532 A9 | 1/2019 |

OTHER PUBLICATIONS

International Search Report and the Written Opinion dated Nov. 4, 2018 From the International Searching Authority Re. Application No. PCT/IL2018/050754. (16 Pages).

* cited by examiner

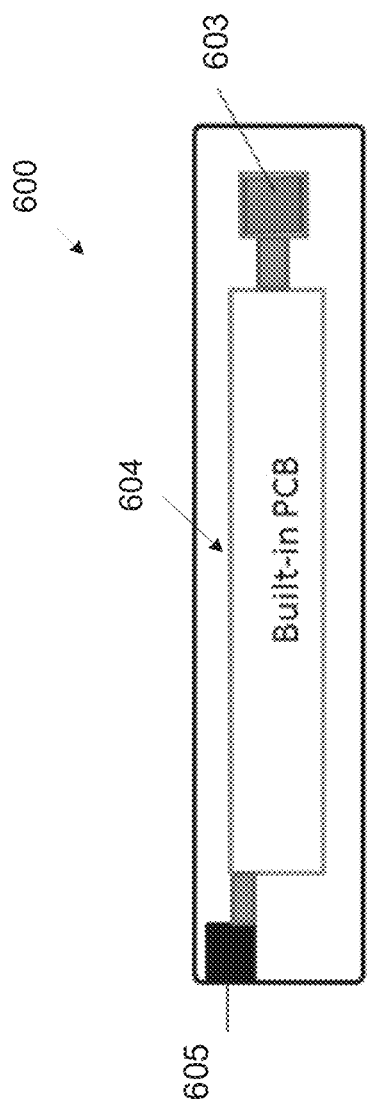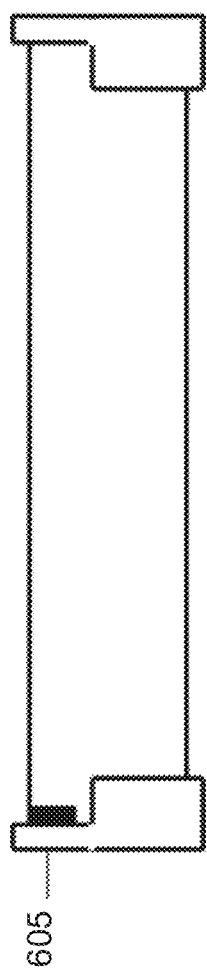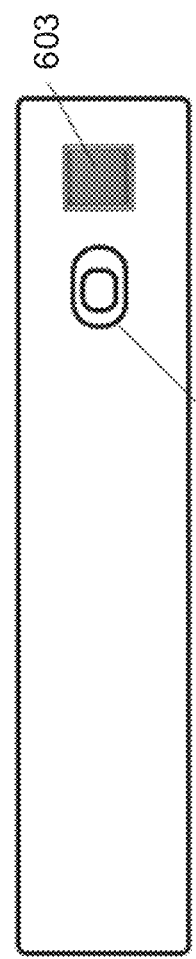

1

SPATIAL OPTICAL WIRELESS COMMUNICATION SYSTEM

RELATED APPLICATIONS

This application is a National Phase of PCT Patent Application No. PCT/IL2018/050754 having International filing date of Jul. 10, 2018, which claims the benefit of priority under 35 USC § 119(e) of U.S. Provisional Patent Application No. 62/530,930 filed on Jul. 11, 2017. The contents of the above applications are all incorporated by reference as if fully set forth herein in their entirety.

BACKGROUND

The present invention, in some embodiments thereof, relates to broadcasting and, more specifically, but not exclusively, to directional broadcasting for the interception of media streams and information by client devices.

The recent push towards wireless connectivity is highlight by the "5G LTE" and Internet of Things (IoT) industry trends. To address the ever-growing amount of users and data, especially in densely populated environments and scenarios (we have designed a new system that will enable optical access to mobile devices. Recent technological advances coupled with similar advances in Optical Wireless Communications (OWC) provide a technological opportunity to deliver vast amounts of data both indoors and outdoors. Three components are needed: a data source, the means to convert the data source into coded optical data stream and transmit it, and a device that that will receive said wireless data stream.

SUMMARY

According to some embodiment of the present invention, there is provided a system. The system comprises a plurality of points of access deployed in venue having a crowd area located next to an event happening area, each one of the plurality of points of access comprising an optical transmitter adapted to broadcast an encoded media stream in light emissions, a plurality of portable optical receiver units, each having: a connector adapted to be electrically connected to one of a plurality of client devices, an optical receiver adapted to capture the light emissions, and a controller adapted to convert the light emissions into a digital stream forwarded via the connector to a respective client device of the plurality of client devices to allow a presentation of the digital stream on a display of the respective client device by an application executed on the respective client device.

Optionally, each of the plurality of points of access is marked with a member of a group consisting: of a billboard having an area of at least one square meter and a blinking light unit.

Optionally, the optical transmitter comprises at least one of a light emitting diodes array and a modulated laser emitting unit.

Optionally, the system further comprises a plurality of cameras for generating simultaneously a plurality of different video streams which are simultaneously broadcasted by the plurality of points of access and depict a common scene from a plurality of different directions.

More optionally, each of the plurality of different video streams is captured by a different subset of portable optical receiver units from the plurality of portable optical receiver units.

More optionally, each one of the plurality of cameras is electronically connected to one of the plurality of points of access; wherein each of the plurality of different video streams is broadcasted by a respective the optical transmitter that is electronically connected to a respective camera from the plurality of cameras.

Optionally, the respective the optical receiver and a camera of the respective client device are facing a common image plane when the respective the portable optical receiver unit is attached to the respective client device.

Optionally, the respective the optical receiver and a camera of the respective client device are facing perpendicular image planes when the respective the portable optical receiver unit is attached to the respective client device.

Optionally, the plurality of points of access are mounted on a plurality of pillars.

Optionally, the plurality of points of access are mounted on a plurality of drones.

Optionally, each of the plurality of portable optical receiver units comprises a mounting structure having at least two mounting elements for mounting a respective the portable optical receiver unit on the respective client device by holding at least two sides of the respective client device.

Optionally, each of the plurality of portable optical receiver units comprises a transmitter for communicating with the plurality of points of access.

Optionally, the application is adapted to send data to a central unit connected to the plurality of portable optical receiver units.

Optionally, the application comprises a module for presenting instructions indicative of maneuvering respective the portable optical receiver unit.

According to some embodiment of the present invention, there is provided a portable optical receiver device. The portable optical receiver device comprises a mounting structure having at least two mounting elements for mounting a respective the portable optical receiver unit on a client device by holding at least two sides of the client device, an electrical connector adapted to be electrically connected to the client device, an optical receiver adapted to capture light emissions, and a controller adapted to convert the light emissions into a digital stream forwarded via the connector to the client device to allow a presentation of the digital stream on a display of the respective client device by an application executed on the respective client device.

Optionally, the respective optical receiver and a camera of the respective client device are facing a common image plane when the respective the optical receiver is attached to the respective client device.

Optionally, the respective the optical receiver and a camera of the respective client device are facing perpendicular image planes when the respective the optical receiver is attached to the respective client device.

According to some embodiment of the present invention, there is provided a method of switching between data streams in correlation with an angular change in a pivot or tilt of a client device. The method comprises capturing a first optical transmission originated from a first optical access transmitted via an open air and encoding a first data stream using an optical receiver of a portable optical receiver device mounted on a client device, decoding the first data stream from the first optical transmission, forwarding the first decoded data stream for a presentation on a display of the client device, after a user holding the client device pivot the client device to face a second optical access device capturing a second optical transmission originated from the second optical access and transmitted via an open air and encoding a second data stream using the optical receiver, decoding the second data stream from the second optical transmission, and forwarding the second decoded data stream for a presentation on the display instead of the first decoded data stream.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 6A, 6B and 6C are a block diagram, a frontal view illustration, and a back view illustration of an optical receiver add-on device, according to some embodiments of the present invention;

DETAILED DESCRIPTION

Figure 1A:
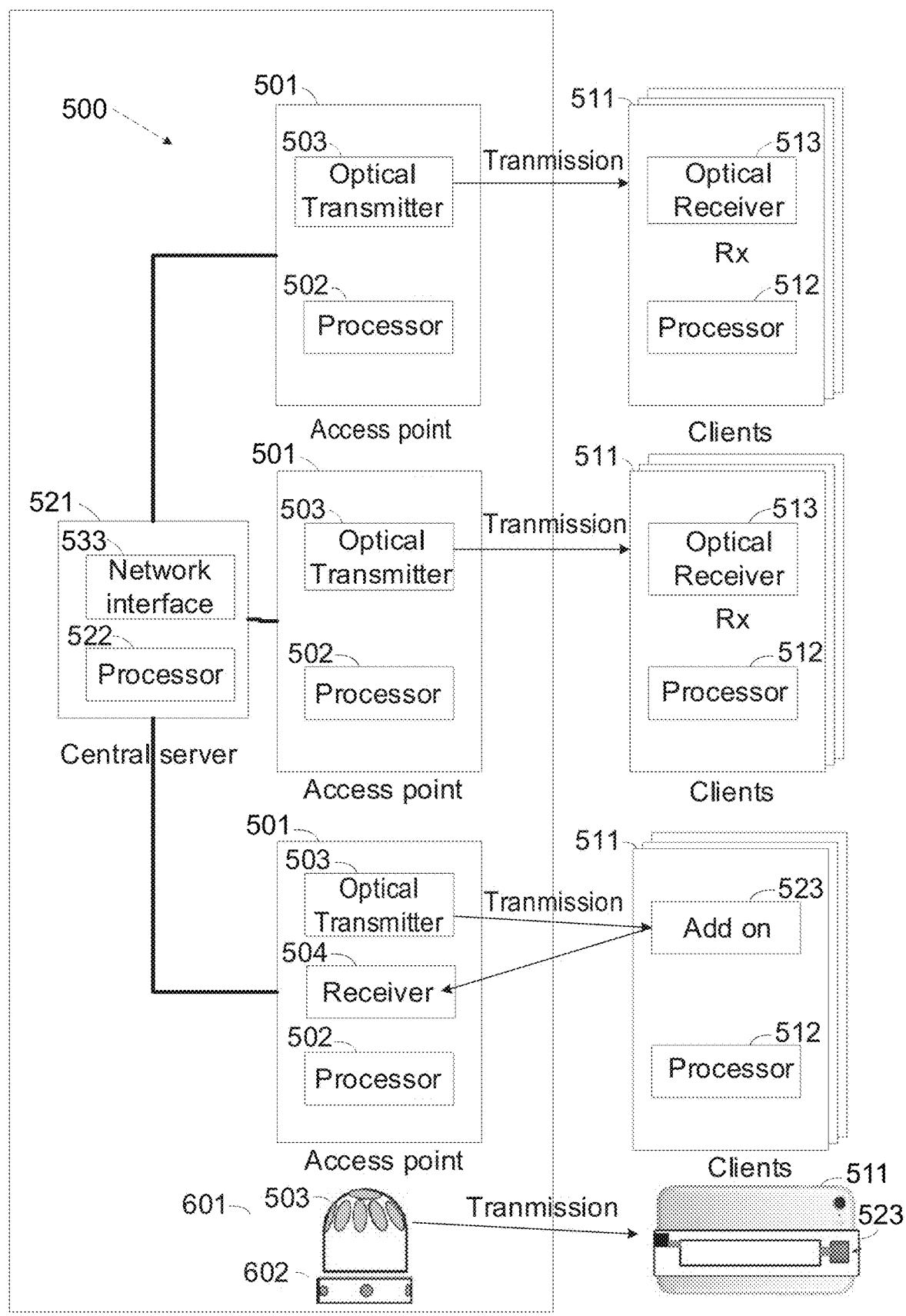
FIG. 1A is a schematic illustration of a system comprising a plurality of optical access points, according to some embodiments of the present invention.

The present invention, in some embodiments thereof, relates to broadcasting and, more specifically, but not exclusively, to directional broadcasting for the interception of media streams and information by client devices.

Free space optical communications have neither been commercially exploited nor regulated. Some embodiment of the present invention provides users with the ability to use their client devices (e.g. smartphone, smartwatches and smart glasses) for interacting wirelessly with optical transmitters deployed in urban areas. The optical transmitters can be used to encode and broadcast data using light such as Light Emitting Diode (LED) light for replacing or complimenting RF cellular network infrastructure. The optical transmitters, also referred to as optical access points, may be deployed to broadcast to client devices or to receivers which are installed in add-on devices which may be suitable to various client devices. In use, for example after electronically connecting the add-on device on a client device, the user may direct the receiver to face an optical transmitter for receiving high-speed wireless data such as video stream and/or images in real time. The direction may be done by applying an image processing functions to the images captured by the camera of the client device and generating guidance instructions to allow the user to direct the optical receiver toward the point of access, for instance tilt right or left and tilt down or up. The instructions may be graphical and/or vocal. In such embodiment, the point of access may be marked with a visible sign such as a target drawn in a billboard area of 1 square meter, 2 square meters, 5 square meters or any intermediate or larger billboard area. Additionally or alternatively, the point of access may be marked using a blinking led lights and/or the like. This wireless data may be a stream of coded optical signals transmitted by one or more wide-angle optical wireless transmitter(s) through the open air, for instance to a selected area in a space around a location in which the optical transmitter is installed. Optionally, a number of optical transmitters are deployed in a perimeter, such as a sport stadium, music hall, mall, city center, etc. The optical transmitters, also referred to as distributed optical access points, are optionally electronically or wirelessly connected to a network.

The present invention, in some embodiments thereof, relates to broadcasting and, more specifically, but not exclusively, to directional broadcasting for the interception of media streams and information by client devices.

According to some embodiments of the present invention there is provided a system for broadcasting media data, such as video data, to different client devices, such as smartphones, by encoding media data captured by different media capturing devices (e.g. cameras and microphones) into different light patterns which are emitted from different optical receivers which of different access points which are deployed in different location in an area. For example, the system comprises a plurality of access points deployed in a venue that optionally has a crowd area located next to an event happening area. Each of the points of access includes an optical transmitter (e.g. a LED based and/or laser based transmitter or transceiver) adapted to broadcast an encoded media stream in light emissions. Optionally, each one of the points of access includes or connected to a different media capturing device such that in use, the optical transmitter of each one of the access points emits a light pattern that encodes a different stream, such as a different video stream. In such embodiment, each video stream may encode video data captured by a different camera. Optionally, the optical transmitter comprises a light emitting diodes array and/or a modulated laser emitting unit that emits modulated laser.

The system further includes a plurality of portable optical receiver units. Each one of the portable optical receiver units has a connector adapted to be electrically connected to one of a plurality of client devices (e.g. a mini USB connector), an optical receiver adapted to capture the light emissions (e.g. a single photo-detector or an array of Photo-Detectors) and a controller adapted to convert light emissions into a digital stream forwarded via the connector to a client device to allow a presentation of the digital stream on a display of the respective client device by an application executed on said respective client device.

Optionally, the portable optical receiver units are add-on devices or being part of add-on devices which are adapted to be attached to a client device, for instance to the back of a smartphone. Optionally, each of the portable optical receiver units comprises a mounting structure having at least two mounting elements for mounting the portable optical receiver unit on the respective client device by holding at least two sides of a client device such as a smartphone or a tablet. In such an embodiment, the optical receiver and a camera of the client device are facing a common image plane when the portable optical receiver unit is attached to the respective client device. This allows instructing the user by augmenting instructions into a display of images captured by the camera of the client device while maneuvering the portable optical receiver unit toward a point of access.

In some embodiments of the present invention, the points of access, also referred to herein as access points, are located above the client devices, optionally with media capturing devices, for instance held by pillars and/or flown by drones. In such embodiments, the portable optical receiver units may be directed upward for acquiring a broadcast. In such an embodiment, the potable optical receiver may be physically disconnected from the client device and electrically connected thereto, either wirelessly or via a wire. For example, the optical receiver of the portable optical receiver unit and a camera of the client device are facing perpendicular image planes when the portable optical receiver unit is attached to the client device.

As indicated above the system further comprises cameras for generating simultaneously a plurality of different video streams which are simultaneously broadcasted by the points of access (a video stream captured by one camera is emitted by the point of access to which the camera is connected). The different video streams may depict a common scene from a plurality of different directions, for example a soccer game, a basketball game and/or the like. In such an embodiment, each of the different video streams is captured by a different subset of portable optical receiver units from the plurality of portable optical receiver units, for example by portable optical receiver units which are manipulated to face one of the plurality of portable optical receiver units.

According to some embodiments of the present invention, a portable optical receiver unit further includes comprises a transmitter for communicating with the plurality of points of access, for instance a radio frequency (RF) transmitter and/or an optical transmitter. The communication may be via the RF transmitter of the client device, for instance the Wi-Fi or cellular module of the client device. In such an embodiment, the communication may be managed by the application executed by the processors of the client device, for instance an app store application. The application may be adapted to send data to a central unit which is optionally connected to the portable optical receiver units. The transmitted data may be an outcome of a poll, a request for information and/or for a stream and/or the like. The application may include a module for presenting instructions indicative of maneuvering respective the portable optical receiver unit, for example as outlined above.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

According to some embodiments of the present invention, there is provided a system that comprises one or more optical access points, such as optical transmitter devices continuously or intermediately emitting data received via a network interface and coded in infrared and/or visible light emissions.

Reference is now made to FIG. 1A which is a schematic illustration of a system 500 comprising a plurality of optical access points 501, each having a processor 502 adapted to encode a data stream and an optical transmitter 503 is adapted to transmit the data stream in air communication channel(s), either directionally or omni-directionally as described below, according to some embodiments of the present invention. The system 500 optionally further connected to or comprises a central server 521 having a network interface 533 and a processor 522 for distributing content to the plurality of optical access points 501, optionally in wired manner. The figure further depicts a plurality of clients 511 which receive data streams via the air communication channel(s).

Each client device 511 has a processor 512 and an optical receiver 513 and/or having mounted thereon an add-on optical receiver device 523 having a controller (e.g. a processor). The client device 511 is optionally a Smartphone and the optical receiver is mounted or otherwise mechanically and/or electronically connected thereto, for instance mounted thereon a smartphone, receives optical data stream from an access point and displays the data on the screen of the smartphone. A more advanced configuration of the receiver can be miniaturized and integrated directly into a smartphone. The processor 512 of each client and/or the controller of each add-on optical receiver device 523 optionally executes a software application, for example a downloadable and installed application which is set to receive the data captured using the add-on optical receiver device 523. For example the application is an app store application or a web browser application that when executed allows the user to decode the received data and optionally to direct the user to maneuver the optical receiver add-on. The application may enable various applications such as location based infotainment (directional by pointing), camera feeds and augmented reality features, for instance as described below.

Optionally, each of the optical transmitters 503 is a device such as a Free-space optical communication (FSO) transmitter that uses light propagating in free space to wirelessly transmit data for telecommunications. Optionally, white LED-based space lighting transmitters for indoor is used; see for example IEEE 802.15.7 which is incorporated herein by reference. An optical access point, such as 501, may be referred to as an optical router or access point. The processor 502 of the access point 501 converts data received via an interface, for instance a wire network card or a wireless receiver, optionally from the central server 521. The processor 502 of the access point 501 includes, executes and/or connected to an optical coder to decode the received information into a coded optical stream and transmit to transmit it forward to the client devices 511 and/or add-on optical receiver device 523. Each access point may support multiple users simultaneously either by broadcast or multi-cast. The Access point 501 may have various configurations that deviate by the use-case or application it serves. The optical receivers 513 and the add-on optical receiver device 523 may be referred to herein interchangeably. The optical receivers 513 may be based on pin sensors, Avalanche or Array Photo-Detectors.

Each optical transmitter 503 optionally comprises an array of LEDs transmitters, for example infra-red wavelength and/or visible light that enables optical wireless broadcasts of up to 100 megabits per second data rates. Additionally o alternatively, the optical transmitter 503 may include an array of laser transmitters adapted to establish an ultra-high-speed link that enables an optical wireless link that is significantly faster (gigabit class bit-rate).

Optionally, the optical access point 501 may further include a receiver 504, such an RF receiver or an optical receiver for establishing bidirectional communication with the client devices using respective transmitter 514, for instance via the optical receivers 513, 523 facing the access point.

The optical access point transmitter 503 may be adapted to transmit in multiple wavelengths, depending on the application. Additional wavelengths or different colors may multiply the bandwidth of the optical link or enable various levels of classification and authorization for different users (by wavelength/color definition)

As described above, an optical receiver add-on device may be used. This device may be adapted to be mounted to cover part of the back of a client device which may be a smartphone and optionally electronically connected to the client device 511 for instance via a mini USB connector. This optical receiver add-on device 523 optionally includes a controller (e.g. processor 512) that executes a code for converting a received optical coded stream to a display the information received on the smartphone's screen. In such a manner, the connector inputs video stream data. Such an optical receiver add-on device 523 may comprise optical elements in various configurations such as narrow field of view or wide field of view and/or one or more of detectors, for instance a single photodetector or a multiple detector array, and/or the like. The optical receiver 513, 523 receives the optical signal from the access point within its field of view and converts the optical stream to a digital data stream for allowing the presentation of data encoded in the optical stream on a display of the client device or of any other a device connected thereto. Optionally, the client device 511 or the optical receiver add-on device 523 executes instruction module which is adapted to augment instructions on a display of images captured using the camera of the client device for directing a user to point to one of the access point(s) 501.

Optionally, the client 511 or the optical receiver add-on device 523 may include an optical transmitter for transmitting data to one of the access point(s) 501. This allows establishing a bidirectional channel. In such an embodiment, a pair of client devices may establish therebetween a bidirectional channel communication channel by aligning a line of sight therebetween such that the optical transmitter of one client device faces the optical receiver of the other client device and vice versa.

It should be noted that although that for brevity the optical receiver add-on device is described herein as a device that can be detached by the user without screwing or gluing or opening the case of the client device; however, the optical receiver add-on device may be an integrated sub system of the client device.

As outlined above, an application executed by the client device 511 manages the data received from the optical receiver add-on device and optionally serves as a portal to all the various applications of the system, for example a module for instructing the user to direct the client device toward the access point. The application may integrate data received by the optical receiver add-on device 523 into the smartphone screen, process and overlay the necessary elements for the service such as smartphone's camera and/or the like. The application may serve as a portal to services using an optical link. Such an application supports different environments and use-cases where access points are active, including any outdoor, urban or rural environments where access points are installed. The application may enable various capabilities such as spatial augmented reality layer, where information or other media is transmitted from an access point and visually presented on the smartphone's screen on top the camera's view, as well as record, edit and share the user experience in real time, and other features for user experience and engagement.

According to some embodiments of the present invention, the system 500 is installed a stadium for enhancing user experience of users using the optical receiver add-on device 523 and the client devices 511 and served as platform for an augmented entertainment experience such as improved visibility and viewing, location based services, and relevant peripheral data.

Optionally, the system 500 allows the client devices 511 and/or the optical receiver add-on device 523 to provide capabilities for in-stadium user experience applications. Using the system 500 spectators in a stadium may have the ability to focus in on any particular action in the field, sport or other, by watching real-time high-resolution moving images of a scene that they are most interested in. In such embodiments, the optical access points 501 are distributed in various locations in the stadium and are optionally connected receive video data captured using high definition video cameras, optionally via the central server 521. Additionally or alternatively, in such embodiments, the optical access points 501 are distributed in various locations in the stadium and are optionally connected receive video data captured using cameras of spectators from the watching crowd which are directly the central server 521, for instance wirelessly via Wi-Fi or Bluetooth protocols. This allows streaming data without using proximate cellular base stations.

Optionally, different optical access points 501 are adapted to transmit video data captured using different video cameras which are pointed to capture activity in different regions of a playfield. For example, one optical access point 501 is located at a left region of the playfield, another optical access point 501 is located at a right region of the playfield and yet another optical access point 501 is located at a central region of the playfield. Clearly multiple other playfield regions may be covered by different cameras which are associated (to send video streams, either directly or indirectly) with different access points 501, for instance in basketball, under the basket, the free-throw line area, and/or the like.

This allows a spectator to direct his client device 511, and optionally the optical receiver add-on device 523 mounted thereon, to one of the optical access points 501 and to receive video content from a corresponding region, for instance, left field region, right field region, and central field region. In such embodiments, the spectator is able to choose a desired point of view and zoom in and out of video data imaging the selected region, and the ability to record, re-run and share the selected scene.

Figure 1B:
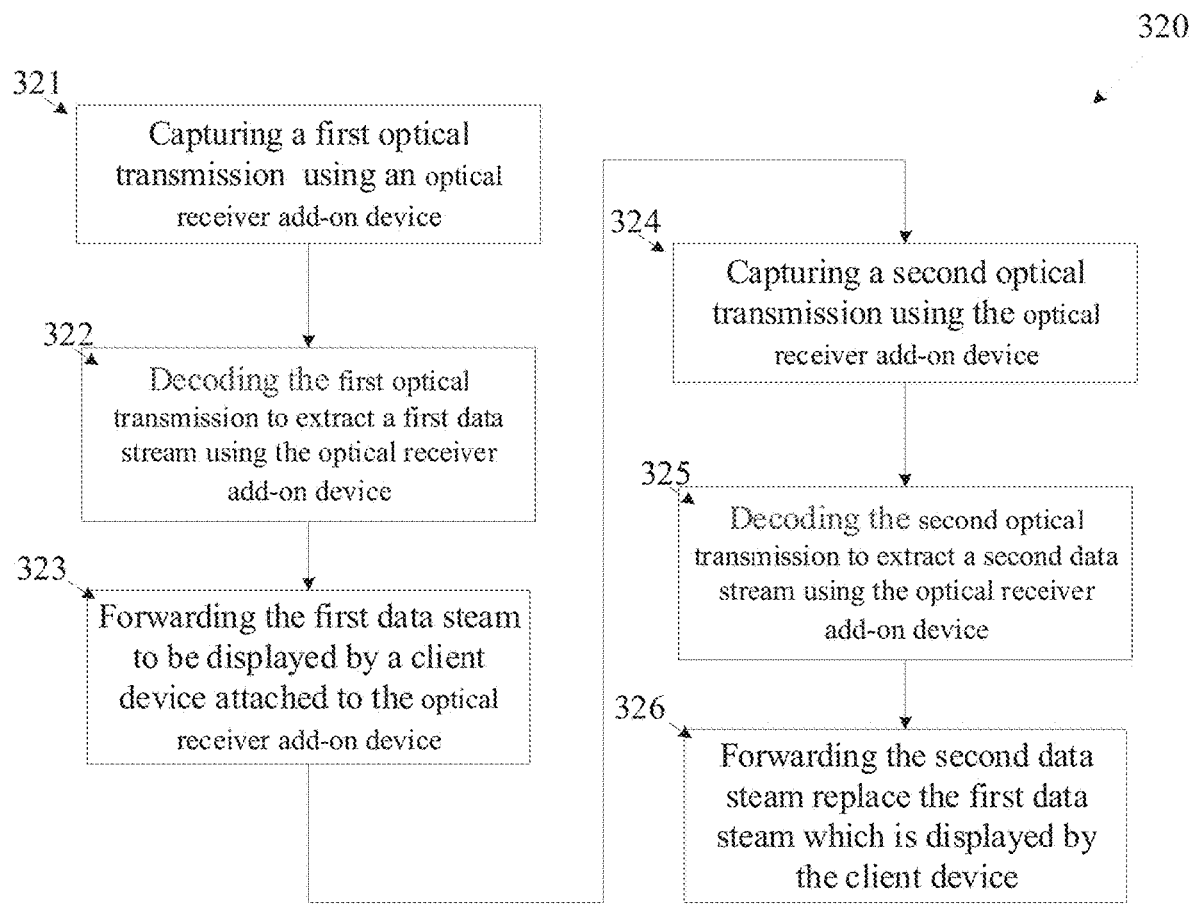
FIG. 1B is a method of switching between data streams displayed on a client device, according to some embodiments of the present invention.

For example reference is now made to FIG. 1B which is a method of switching between data streams in correlation with an angular change in a pivot or tilt of a client device, according to some embodiments of the present invention. In this method, the data streams which is presented to on a display of a client device are switched as an outcome of a change in the optical transmissions which are captured by the optical receiver add-on device 523 as an outcome of a change in the angle of the optical receiver add-on device 523. First, as shown at 321, a first data stream encoded as a first optical transmission transmitted via the air is captured using an optical receiver, optionally of an optical receiver add-on device such as depicted 523. Now, as shown at 322, the first optical transmission is decoded to extract the first data stream, for instance using the processor of the receiver add-on device. As shown at 323 the decoded data stream is forwarded for being displayed on a client device attached to the receiver add-on device, for instance the client device depicted in 511. Now, as shown at 324, a second data stream is captured from a second optical access device, for instance after a user holding the client device pivot the client device to face the second optical access device. Now, as shown at 325, a new optical transmission from the second optical access device is decoded to extract a second data stream, for instance using the processor of the receiver add-on device and as shown at 326 the second decoded data stream is forwarded for being displayed on the client device instead of the first decoded data stream.

Optionally, the instruction module incorporates promotional augmented reality data in the viewer's scene, for instance for offering commercial location based services.

Additionally or alternatively, the video data received from the optical transmitter(s) 503 is captured using a drone, equipped with a camera for enabling bird's-eye view of the pitch from above. In such embodiments, the respective access point 501 may be stationary or integrated into the drone, allowing a spectator may point his client device 511, and optionally the optical receiver add-on device 523 mounted thereon, at the drone to receive real-time video stream from the drone's camera. Additionally or alternatively, a pillar equipped with a camera and optical access point 501 that enables bird's-eye view of the pitch from above is used. The user will point his client device 511, and optionally the optical receiver add-on device 523 mounted thereon, at the drone to receive real-time video stream from the drone's camera.

It should be noted that the although the above is described with reference to a stadium, it may be similarly implemented for monitoring applications in security, infrastructure deployment and construction sites, everywhere a real-time visual feed are beneficial for ongoing activity. In such embodiments, the client device 511, and/or the optical receiver add-on device 523 mounted thereon may be directed or adapted to be directed toward drone, for example perpendicular to the screen of the client device.

Some embodiments of the present invention enable a spectator in a sport venue or music show to zoom-in live on different points of view, receive HD video and voice, and be connected to a local area network of people, all share the same event together in time and place.

According to some embodiments of the invention the optical access points 501 are distributed in a plurality of area in a human settlement such aa applications. This allows replacing radio frequency communication in public with the above described system for reducing radiation levels and interference as well as carrier bandwidth spectrum relief. Installing optical access points 501 on city infrastructure and buildings, in high traffic locations, enables a user to receive directional information using the client device 511, and/or the optical receiver add-on device 523 which is mounted thereon. The directional information may be relevant to a specific location in which the optical access point is located. In addition to a location based data feed, an optical access point 501 may be connected to the computer network such as the internet, wired using copper or fiber, or wirelessly via cellular, Wi-Fi or other, and enable an optical data download stream, optionally using the central server 521.

In addition to location based services and data feeds, some embodiments of the present invention enable new features and applications for user experience and reality enhancement, mainly in the field of augmented reality (AR), where a digital virtual layer may be transmitted from a specific access point, this virtual layer is then being augmented on the reality layer, by a combination of the smartphone camera and the optical receiver device application software. For example, the user is looking on a building with an access point on it, the building is seen thorough the smartphone screen, the access point transmits a virtual visual layer that is augmented on the physical environment.

Optionally, each or some of the optical access points 501 is deployed with a visible indication, such as a light emitting unit or a sign emitting a visual signal such as light. The light may be in various colors to indicate different applications or data feeds, for example an orange light is indicative of advertisement data and a green light is indicative of tourist information related to a specific location wherein the respective access point is installed.

Optionally, as depicted by reference numeral 601, the access point comprises a housing with light emitters 503 and one or more cameras 602. Such housing facilitates easy installation of camera enhanced access points and the distribution of content captured using the cameras 602 to spectators of such access points.

Figure 2A:
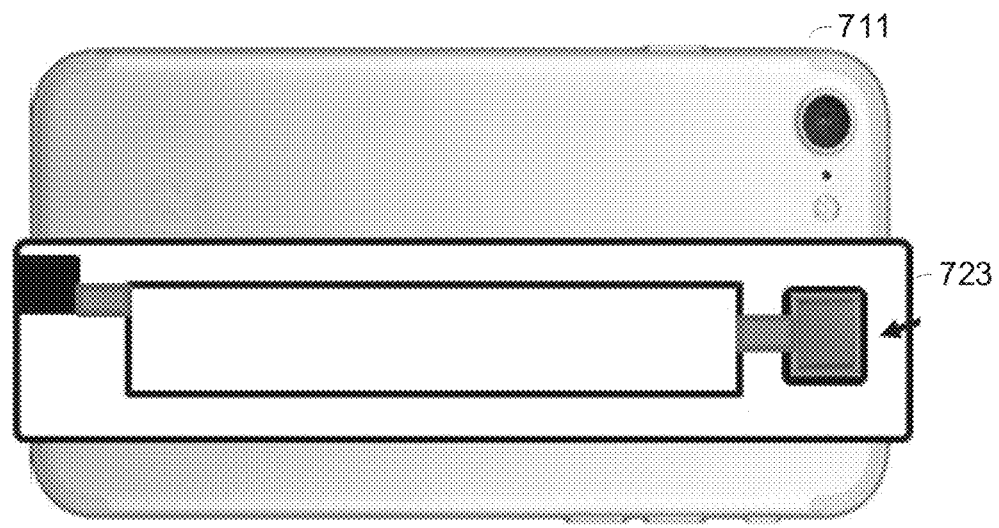
FIGS. 2A and 2B are schematic illustrations of a back and a front of an exemplary optical receiver add-on device mounted on a client device, according to some embodiments of the present invention.
Figure 2B:
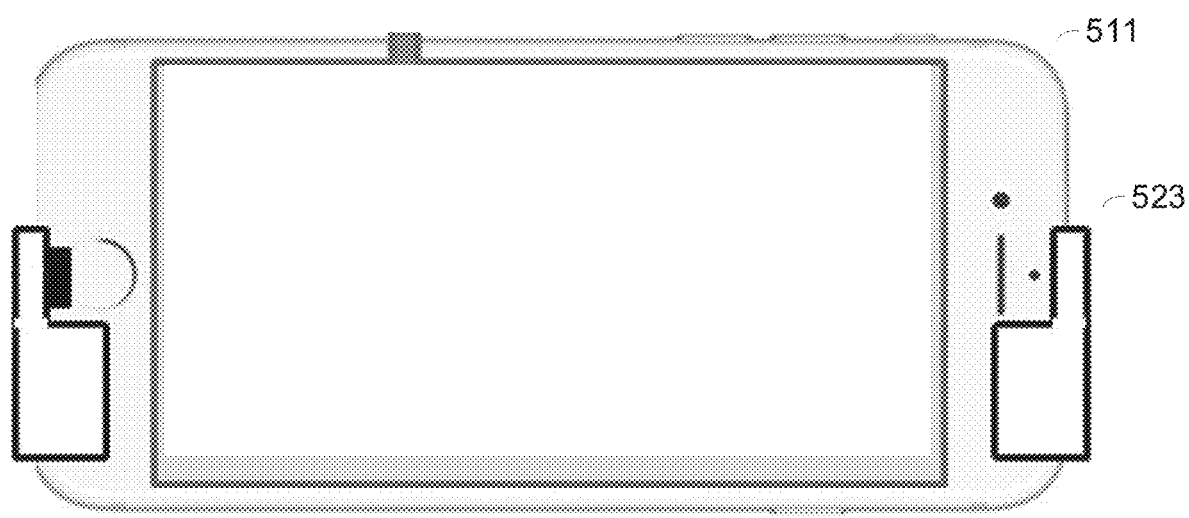

Reference is also made to FIGS. 2A and 2B which are schematic illustrations of a back and a front of an exemplary optical receiver add-on device 723 mounted on a client device 711, according to some embodiments of the present invention. The exemplary optical receiver add-on device 723 includes a detachable mounting structure sized and shaped to snap on the client device 711. The mounting structure houses a PCB with a controller and an optical receiver, each as defined above. The mounting structure has at least two mounting elements for mounting the portable add-on device on a client device by holding at least two sides, optionally opposite, of the client device. The optical receiver add-on device 723 includes an electrical connector adapted to be electrically connected to the client device and an optical receiver, such as 513$m$ to capture light emissions. The optical receiver add-on device 723 optionally includes a controller adapted to convert light emissions into a digital stream forwarded via the connector to the client device to allow a presentation of the digital stream on a display of the respective client device by an application executed on the respective client device. Optionally, as depicted, the optical receiver add-on device 723 is mounted to face a common image plane with a camera of the client device it is mounted on when it is attached to the client device. Optionally, the optical receiver add-on device is mounted such that the optical receiver the image place thereof is perpendicular to an image plane of a camera of a respective client device when said respective the optical receiver add-on device is attached to the respective client device.

Figure 3:
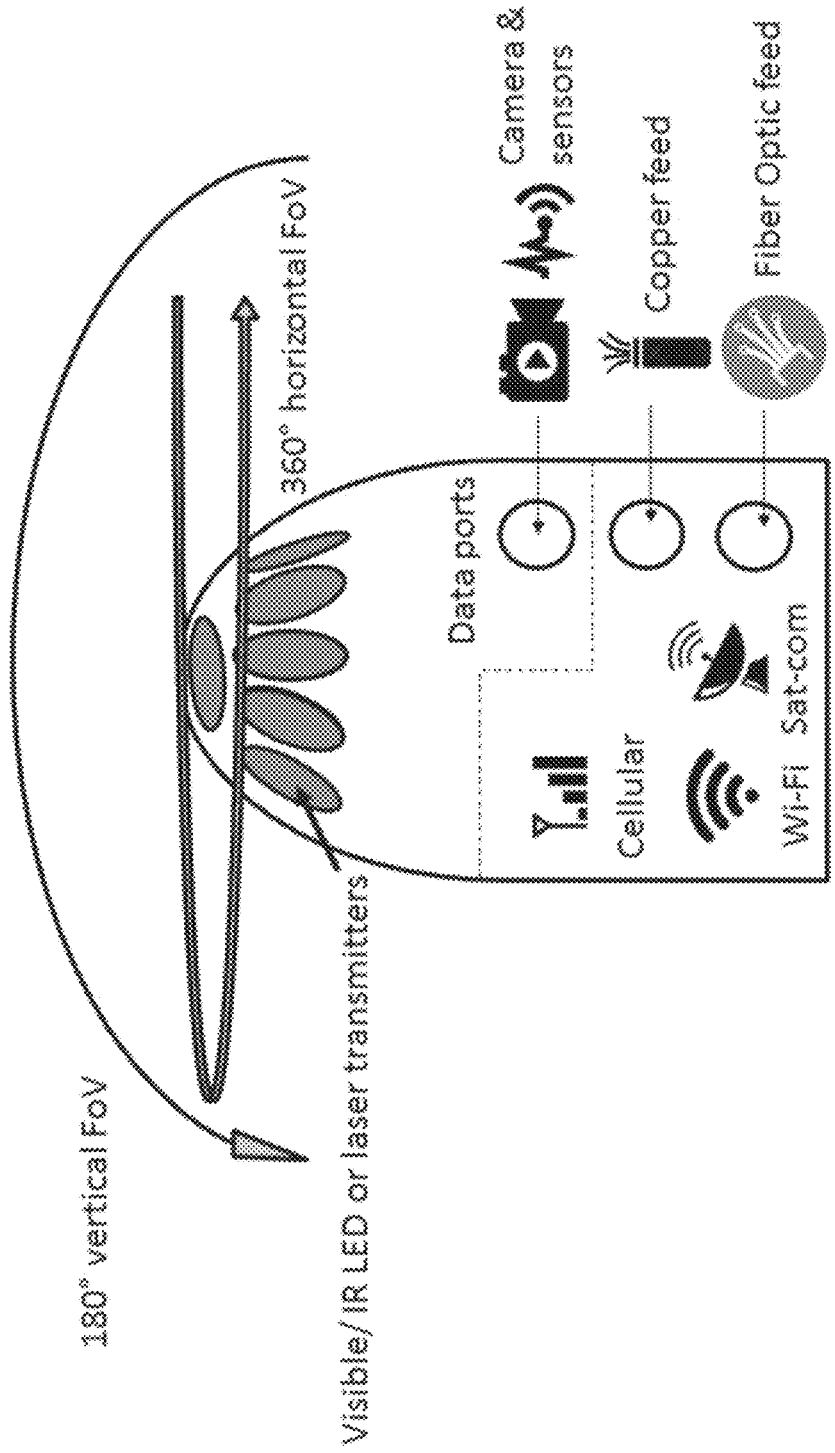
FIG. 3 is a schematic illustration of an exemplary optical access point, according to some embodiments of the present invention.

Reference is also made to FIG. 3, which is a schematic illustration of an exemplary optical access point, according to some embodiments of the present invention. The optical access point comprises a plurality of LEDs or laser sources where each source or LED has an optic arrangement and a field of view so that the plurality of LEDs or laser sources cumulatively provide a hemispherical coverage of 360° in azimuth and 90° in elevation. Optionally, such an access point may be programmed as a directional access point, for instance by operating only some of the LEDs or laser sources and cameras for covering a certain segment. FIG. 3 exemplifies various possible input data feeds. Light can also be used in different wavelengths to enable various channels for the user to browse or other applications. Optionally, such optical access points communicate with each other, to form an optical wireless network. Each of such optical access points includes one or more receivers, such as 504, to receive optical data feeds from client devices and/or other access points.

Optionally, the optical transmitter 503 comprises a multitude of LEDs sources as light emitters. The multitude of LEDs are either visible or non-visible (e.g. in the Infra-red spectrum).

Figure 4A:
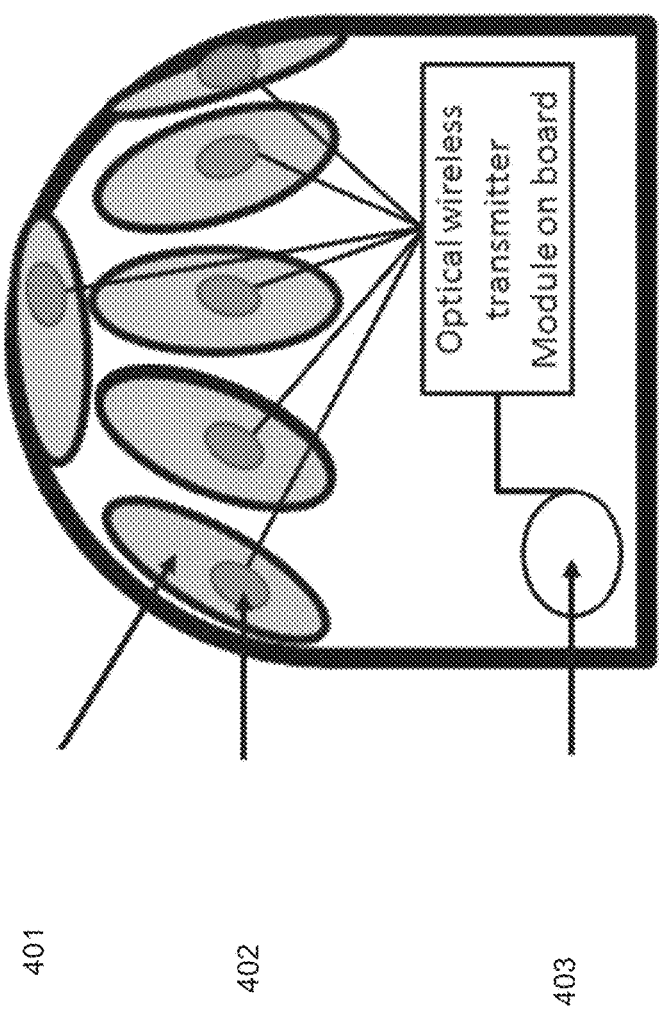
FIG. 4A is a schematic illustration of another exemplary optical access point, according to some embodiments of the present invention.
Figure 4B:
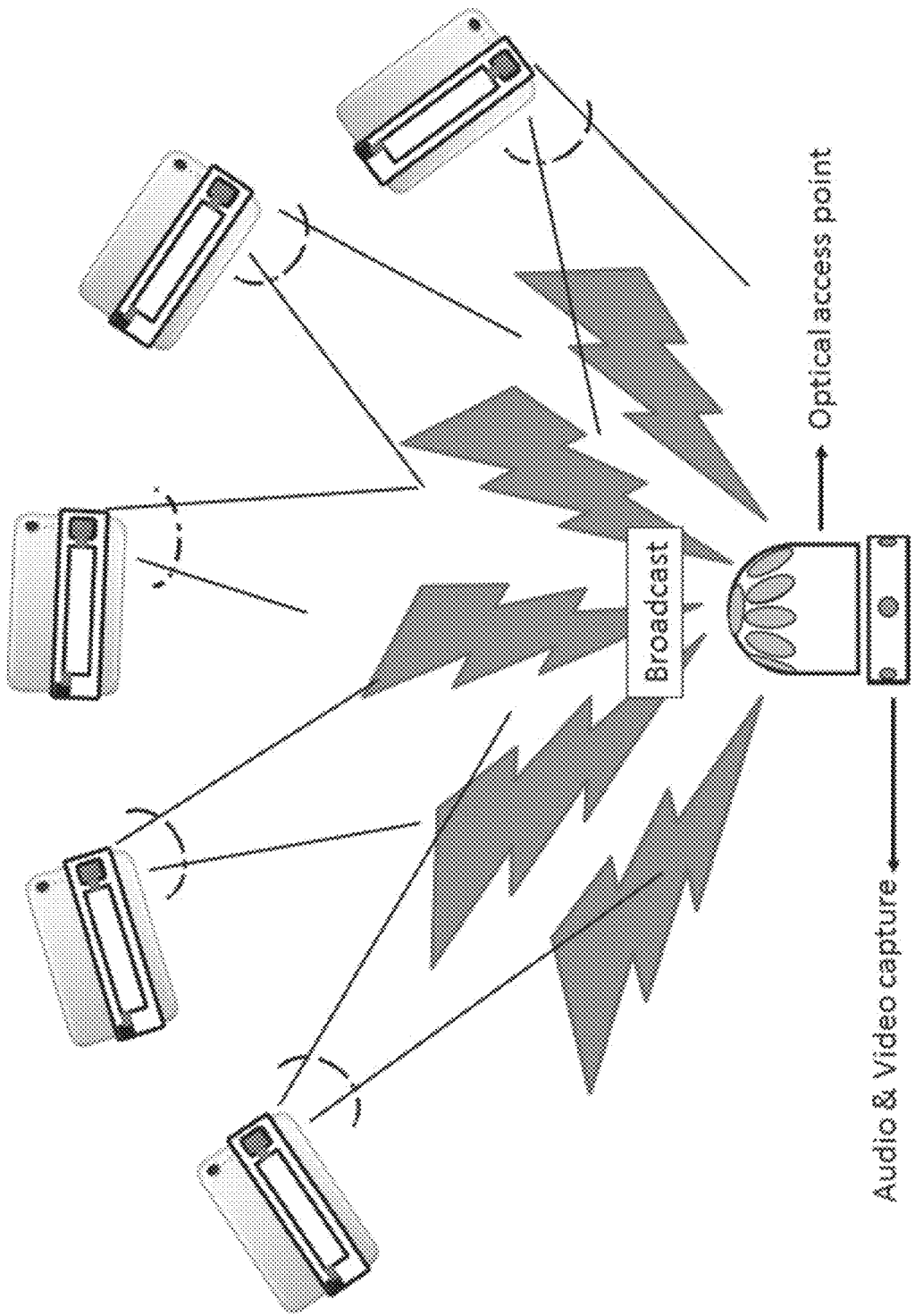
FIG. 4B is a schematic illustration of an exemplary optical access point transmitting data to multiple client devices, according to some embodiments of the present invention.
Figure 4C:
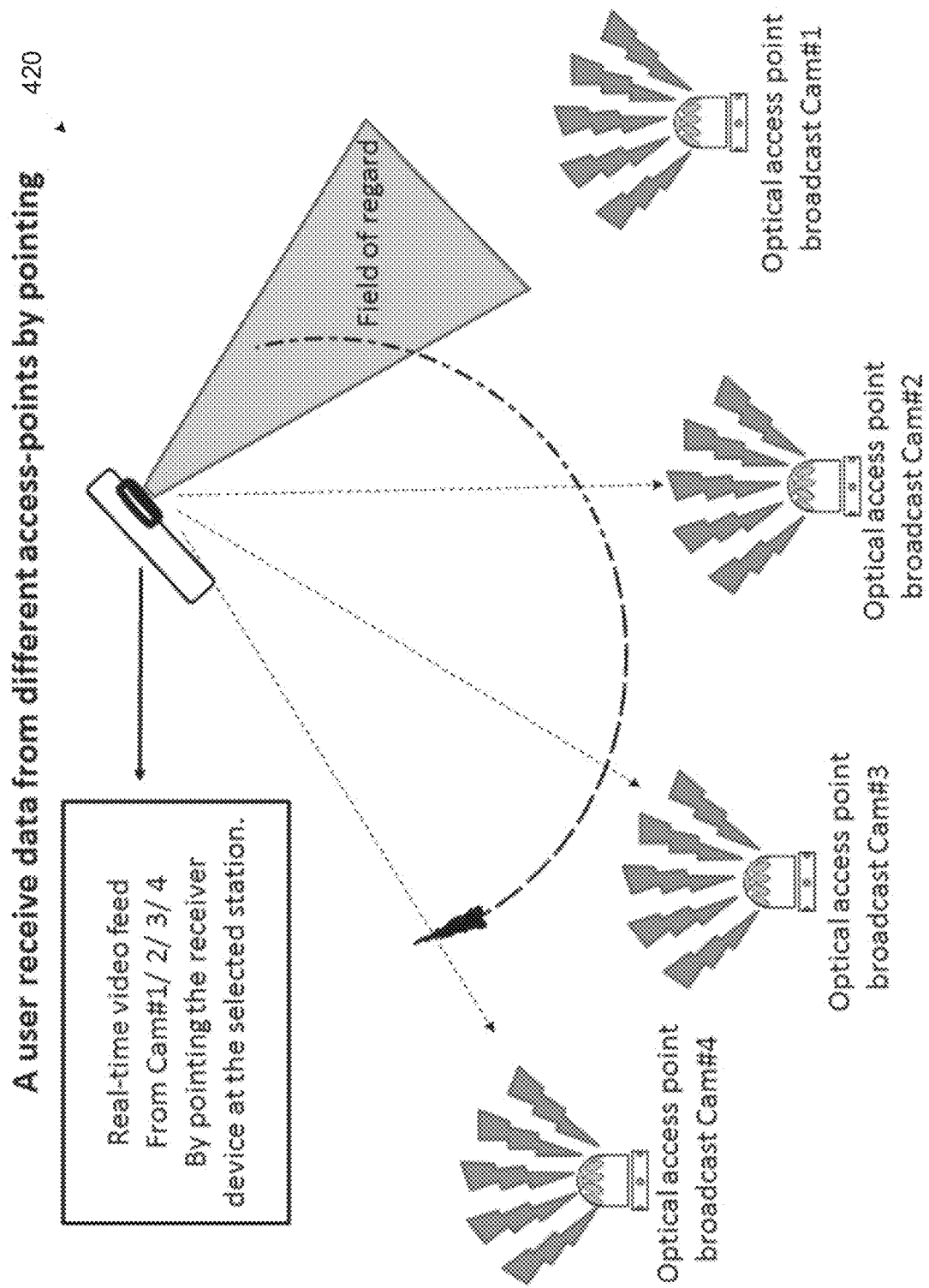
FIG. 4C is a schematic illustration of optical receiver add-on device and a plurality of different access points, according to some embodiments of the present invention.

Reference is also made to FIG. 4A, which is a schematic illustration of another exemplary optical access point 400, according to some embodiments of the present invention. The optical access point 400 is adapted for using a multitude of laser sources 401 that are eye safe regulated. Each member of the array of multiple small lasers sources 401 has optics 402 and a field of view. The optical access point 400 may be used for a directional transmission, dependent on the application, as described above. The array of multiple small lasers sources 401 are mounted to provide, together, a hemispherical coverage of 360° in azimuth and 90° in elevation for establishing an optical wireless link in a free space. This allows transmitting data to multiple client devices which surround the optical access point 400 for example as shown at FIG. 4B. This figure depicts how multiple optical receiver add-on devices 723 devices, mounted on smartphones, pick up same signal from a single access point. Optionally, as shown at FIG. 4C, each optical receiver add-on devices 723 may be aimed by the user to capture data from any of a plurality of different access points. The multiple access points in FIG. 4C may transmit a camera stream captured by camera(s) thereof and/or other data feed, for example from cameras housed in the same housing as the respective optical transmitter.

Figure 5:
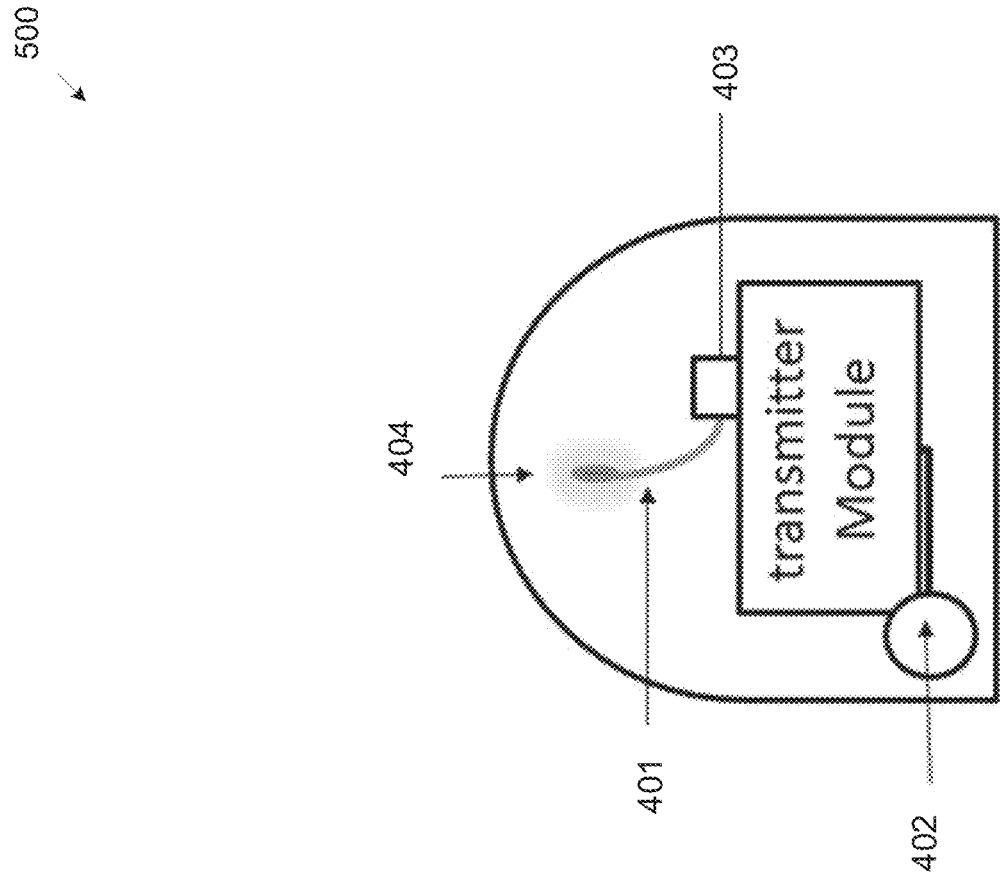
FIG. 5 is a schematic illustration of another exemplary optical access point, according to some embodiments of the present invention.

Reference is also made to FIG. 5, which is a schematic illustration of another exemplary optical access point 400, according to some embodiments of the present invention. The exemplary optical access point 400 includes an LED or laser source 403 connected to a fiber or guide 401 and to a transmitter module 403. The fiber or guide 401 transmits into an open air a source feed received via an interface 402. The tip of the fiber or guide 404 is cut to diffract light in a manner that is either directional or omnidirectional (sphere).

Reference is also made to FIGS. 6A, 6B and 6C which are a block diagram, a frontal view illustration, and a back view illustration of an optical receiver add-on device 600, according to some embodiments of the present invention. The optical receiver device has an optical photo detector 603, an embedded PCB 604 and a dock connector 605 to electronically connect to an interface of a smartphone, for instance a phone data port and/or dock. The optical receiver add-on device 600 may be sized and shaped to fit various client devices without disrupting a field of view of a camera 606. The embedded PCB 604 processes signals captured by the optical photo detector 603 from an optical access point deployed in a line of sight from therefrom the visible area and feed the data to the smartphone's display application, as will be illustrated in the following drawings. Data may be streaming video, images, computer network data and/or the like. Each optical photo detector 603 is optionally tunable for capturing light emitted from various transmitters, for instance from transmitters distributed at different distances from the optical photo detector 603 around the stadium and/or deployed environment within its effective range and field of view. Optionally, the optical receiver add-on device 600 includes an optical transmitter, either LED or laser based, that will enable device-to-device link and/or uplink to access point(s).

Figure 7A:
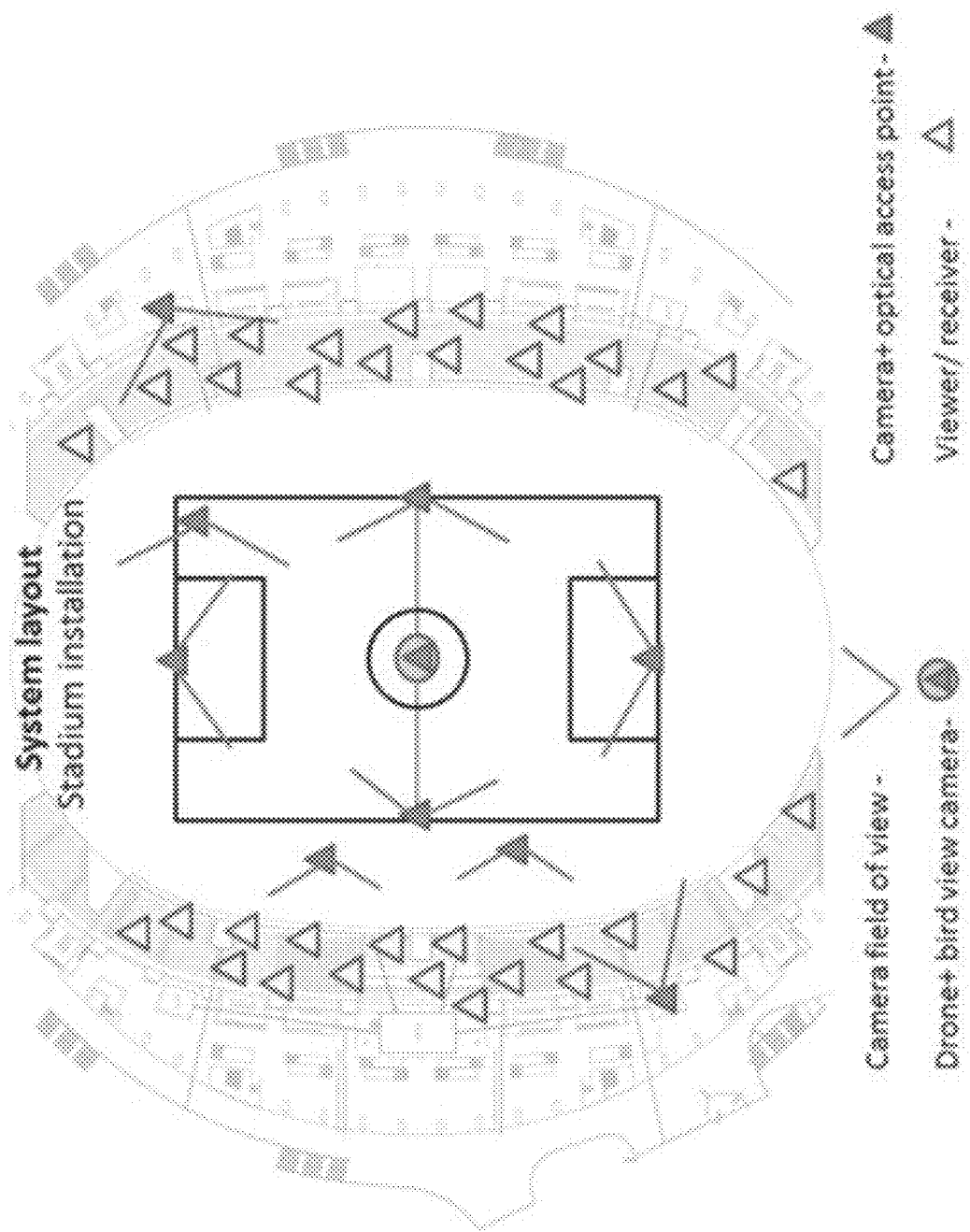
FIG. 7A is an exemplary deployment of optical access points in a sports stadium, according to some embodiments of the present invention.

FIG. 7A is an exemplary deployment of optical access points in a sports stadium, according to some embodiments of the present invention. Each of the optical access points includes a high-resolution video recording camera and optical wireless transmitter. The optical access points are spread round the stadium field to record and transmit activity inside the stadium, for instance as described above. In use, for example during a sport event, a spectator may point his client device on a selected access point within his field of view and receive live video stream from different angles, for instance a bird's eye view, a goalkeeper perspective and/or any other zoom-in angle around the pitch.

Figure 7B:
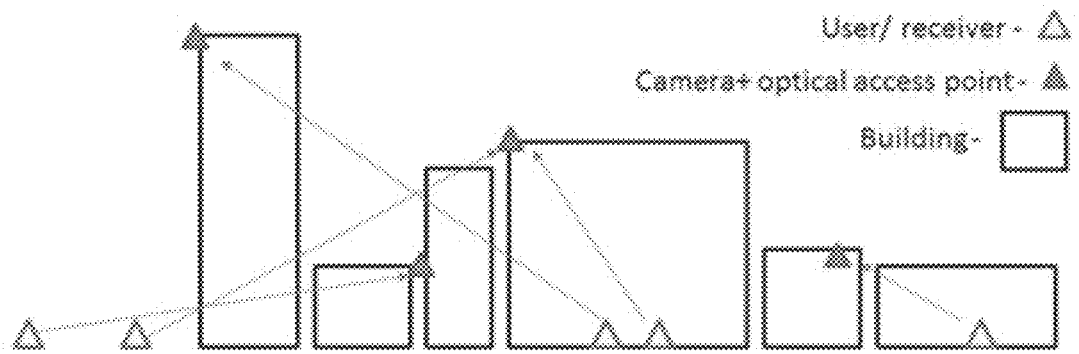
FIGS. 7B and 7C are lateral schematic views of deployment of access points in an in urban environment, according to some embodiments of the present invention.
Figure 7C:
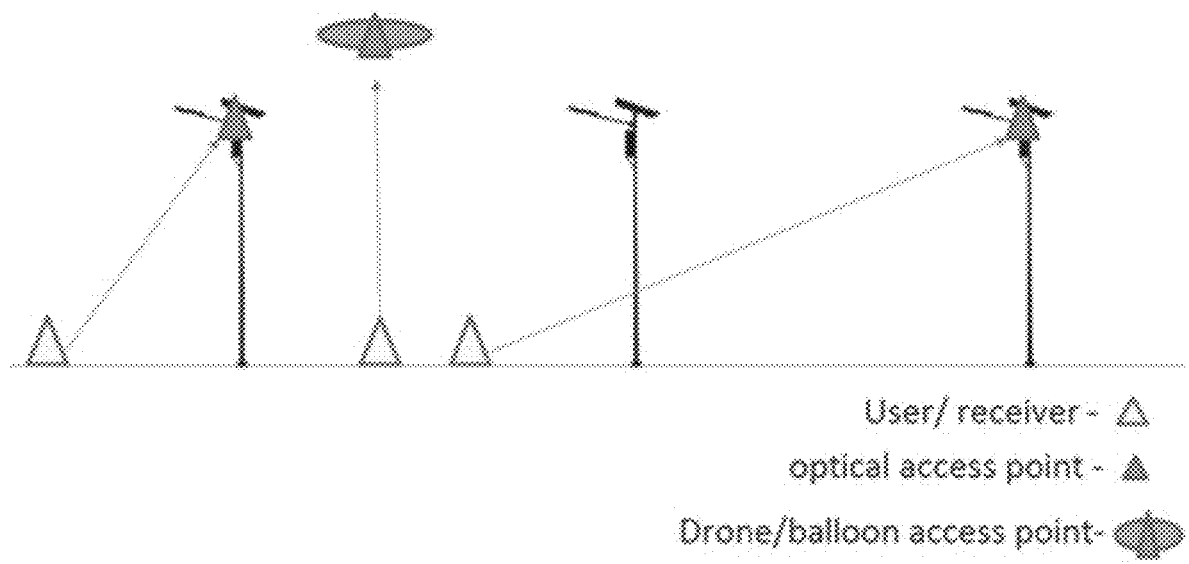

FIGS. 7B and 7C are lateral schematic views of deployment of access points in an in urban environment, according to some embodiments of the present invention. The optical wireless access-points are spread at different locations in a settlement so that a user may point his client device on each access point within his field of view and receive data to enable, for example, various infotainment and connectivity services and applications. The access-points can either be connected to a network or independently supply application-based information. The data received from the various access-points may be augmented on the smartphone's camera view in a way that will enable various augmented reality applications that are location-based.

The methods as described above are used in the fabrication of integrated circuit chips.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term an image sensor, a receiver, a transmitter, and an access point is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system, comprising:
    a plurality of points of access deployed in venue having a crowd area located next to an event happening area, each one of the plurality of points of access comprising an optical transmitter adapted to broadcast an encoded media stream in light emissions;
    a plurality of portable optical receiver units, each having:
        a connector adapted to be electrically connected to one of a plurality of client devices,
        an optical receiver adapted to capture the light emissions, and
        a controller adapted to convert the light emissions into a digital stream forwarded via the connector to a respective client device of the plurality of client devices to allow a presentation of the digital stream on a display of the respective client device by an application executed on the respective client device;
    a plurality of cameras for generating simultaneously a plurality of different video streams which are simultaneously broadcasted by the plurality of points of access and depict a common scene from a plurality of different directions;
    wherein each one of the plurality of cameras is electronically connected to one of the plurality of points of access; wherein each of the plurality of different video streams is broadcasted by a respective the optical transmitter that is electronically connected to a respective camera from the plurality of cameras.

2. The system of claim 1, wherein each of the plurality of points of access is marked with a member of a group consisting: of a billboard having an area of at least one square meter and a blinking light unit.

3. The system of claim 1, wherein the optical transmitter comprises at least one of a light emitting diodes array and a modulated laser emitting unit.

4. The system of claim 1, wherein the plurality of points of access are mounted on a plurality of pillars.

5. The system of claim 1, wherein the plurality of points of access are mounted on a plurality of drones.

6. The system of claim 1, wherein each of the plurality of portable optical receiver units comprises a mounting structure having at least two mounting elements for mounting one of the plurality of portable optical receiver units on the respective client device by holding at least two sides of the respective client device.

7. The system of claim 6, wherein the portable optical receiver unit, comprising:
    an electrical connector adapted to be electrically connected to the respective client device.

8. The system of claim 1, wherein each of the plurality of portable optical receiver units comprises a transmitter for communicating with the plurality of points of access.

9. The system of claim 1, wherein the application is adapted to send data to a central unit connected to the plurality of portable optical receiver units.

10. A system, comprising:
    a plurality of points of access deployed in venue having a crowd area located next to an event happening area, each one of the plurality of points of access comprising an optical transmitter adapted to broadcast an encoded media stream in light emissions;
    a plurality of portable optical receiver units, each having:
        a connector adapted to be electrically connected to one of a plurality of client devices,
        an optical receiver adapted to capture the light emissions, and
        a controller adapted to convert the light emissions into a digital stream forwarded via the connector to a respective client device of the plurality of client devices to allow a presentation of the digital stream on a display of the respective client device by an application executed on the respective client device;
wherein one of the plurality of optical receivers and a camera of the respective client device are facing a common image plane when the one of the plurality of portable optical receiver units is attached to the respective client device.

11. The system of claim 10, further comprising a plurality of cameras for generating simultaneously a plurality of different video streams which are simultaneously broadcasted by the plurality of points of access and depict a common scene from a plurality of different directions.

12. The system of claim 11, wherein each of the plurality of different video streams is captured by a different subset of portable optical receiver units from the plurality of portable optical receiver units.

13. A system, comprising:
a plurality of points of access deployed in venue having a crowd area located next to an event happening area, each one of the plurality of points of access comprising an optical transmitter adapted to broadcast an encoded media stream in light emissions;
a plurality of portable optical receiver units, each having:
a connector adapted to be electrically connected to one of a plurality of client devices,
an optical receiver adapted to capture the light emissions, and
a controller adapted to convert the light emissions into a digital stream forwarded via the connector to a respective client device of the plurality of client devices to allow a presentation of the digital stream on a display of the respective client device by an application executed on the respective client device;
wherein one of the plurality of optical receivers and a camera of one of the plurality of client devices are facing a perpendicular image plane when the one of the plurality of portable optical receiver units is attached to one of the plurality of client devices.

14. A system, comprising:
a plurality of points of access deployed in venue having a crowd area located next to an event happening area, each one of the plurality of points of access comprising an optical transmitter adapted to broadcast an encoded media stream in light emissions;
a plurality of portable optical receiver units, each having:
a connector adapted to be electrically connected to one of a plurality of client devices,
an optical receiver adapted to capture the light emissions, and
a controller adapted to convert the light emissions into a digital stream forwarded via the connector to a respective client device of the plurality of client devices to allow a presentation of the digital stream on a display of the respective client device by an application executed on the respective client device;
wherein the application comprises a module for presenting instructions indicative of maneuvering one of plurality of the portable optical receiver units.

15. A system, comprising:
a plurality of points of access deployed in venue having a crowd area located next to an event happening area, each one of the plurality of points of access comprising an optical transmitter adapted to broadcast an encoded media stream in light emissions;
a plurality of portable optical receiver units, each having:
a connector adapted to be electrically connected to one of a plurality of client devices,
an optical receiver adapted to capture the light emissions, and
a controller adapted to convert the light emissions into a digital stream forwarded via the connector to a respective client device of the plurality of client devices to allow a presentation of the digital stream on a display of the respective client device by an application executed on the respective client device;
wherein the portable optical receiver unit, comprising:
an electrical connector adapted to be electrically connected to the respective client device;
wherein one of the plurality of optical receivers and a camera of the respective client device are facing a common image plane when the respective the optical receiver is attached to the respective client device.

16. A system, comprising:
a plurality of points of access deployed in venue having a crowd area located next to an event happening area, each one of the plurality of points of access comprising an optical transmitter adapted to broadcast an encoded media stream in light emissions;
a plurality of portable optical receiver units, each having:
a connector adapted to be electrically connected to one of a plurality of client devices,
an optical receiver adapted to capture the light emissions, and
a controller adapted to convert the light emissions into a digital stream forwarded via the connector to a respective client device of the plurality of client devices to allow a presentation of the digital stream on a display of the respective client device by an application executed on the respective client device;
wherein the portable optical receiver unit, comprising:
an electrical connector adapted to be electrically connected to the respective client device;
wherein one of the plurality of optical receiver and a camera of the respective client device are facing a perpendicular image planes when the respective the optical receiver is attached to the respective client device.

* * * * *